(12) United States Patent
Kim et al.

(10) Patent No.: US 8,473,015 B2
(45) Date of Patent: Jun. 25, 2013

(54) STOPPER DEVICE FOR SLIDING SWING TYPE PORTABLE COMMUNICATION DEVICE

(75) Inventors: Won-Tae Kim, Gyeonggi-do (KR); Sang-Joon Park, Seoul (KR); Pil-Je Cho, Gyeonggi-do (KR); Young-Woo Huh, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 389 days.

(21) Appl. No.: 12/845,928

(22) Filed: Jul. 29, 2010

(65) Prior Publication Data

US 2011/0045879 A1 Feb. 24, 2011

(30) Foreign Application Priority Data

Aug. 19, 2009 (KR) ........................ 10-2009-0076825

(51) Int. Cl.
 *H04M 1/00* (2006.01)
(52) U.S. Cl.
 USPC .................................. 455/575.3; 455/575.4
(58) Field of Classification Search
 USPC ... 455/575.1, 575.3, 575.4, 90.3; 379/433.01, 379/433.11, 433.12, 433.13, 440; 361/724, 361/727
 See application file for complete search history.

(56) References Cited

U.S. PATENT DOCUMENTS

| 2006/0025184 A1* | 2/2006 | Cho et al. ................... 455/575.4 |
| 2006/0211460 A1* | 9/2006 | Jeong et al. ................. 455/575.4 |
| 2009/0036181 A1* | 2/2009 | Lee ............................ 455/575.4 |

FOREIGN PATENT DOCUMENTS

KR   10-0681068   2/2007

\* cited by examiner

*Primary Examiner* — Nguyen Vo
(74) *Attorney, Agent, or Firm* — Cha & Reiter, LLC (57) ABSTRACT

Provided is a stopper device for a sliding swing type portable communication device, in which a stopper is made up of a small number of parts capable of restricting the swinging operation after sliding operation as well as the sliding operation after the swing operation. The stopper device includes a body housing and a sliding housing opened or closed by sliding or swinging in relation to the body housing, a first sliding member coupled to the sliding housing, a second sliding member coupled to the first sliding member to enable the first sliding member to slide, a swing member coupled to the body housing, installed between the first and second sliding members, to allow the first and second sliding members to swing, and a stopper unit provided to each member, restricting the swinging of the sliding housing when the sliding housing slides and the sliding of the sliding housing when the sliding housing swings before sliding.

20 Claims, 11 Drawing Sheets

STOPPER DEVICE FOR SLIDING SWING TYPE PORTABLE COMMUNICATION DEVICE

CLAIM OF PRIORITY

This application claims priority to an application entitled "Stopper Device for Sliding Swing Type Portable Communication Device" filed in the Korean Intellectual Property Office on Aug. 19, 2009 and assigned Serial No. 10-2009-0076825, the contents of which are hereby incorporated by reference.

BACKGROUND OF THE INVENTION

1. Field of the Invention

The present invention relates to a stopper device for a sliding swing type portable communication device, in which a stopper comprise of small components to restrict a swing operation after sliding operation as well as the sliding operation after the swing operation.

2. Description of the Related Art

In general, a "portable communication device" refers to an electronic device that a user can carry around to perform wireless communication with a desired party. In consideration of portability, the design of such a portable communication device must be compact, slim, hand-held, and light, but also capable of increasing the use of multimedia having various functions. In future, portable communication devices will be used for many other functions and purposes for various multimedia or Internet environments.

The portable communication devices are typically classified into a bar-type, a flip-type, or a folder-type. Further, the portable communication devices are also classified into a neck wearable-type or a wrist wearable-type according to wearing position or method. In addition, the portable communication devices are also classified into a swing-type or a sliding-type according to opening/closing method.

Such conventional portable communication devices are designed to allow for a voice communication function as well as a high-speed data communication function. A camera function is incorporated in the portable communication device, so that it is possible to transmit an image signal. Such a device is provided with a camera lens module of an internal or external type, so that it is possible to perform image communication visually or to photograph a desired subject.

Currently, it is inconvenient to watch a video or a television (TV) through the portable communication device. This is because, in the case of a TV watching mode or a video watching mode, a wider display screen is required for a display device through which information is displayed.

Recent portable communication devices allow the display device to be moved and then swung. For example, the sliding swing device of the conventional portable communication device is disclosed in detail in Korean Patent No. 0681068, which has been filed and granted by the present applicant. It discloses a body housing, a sliding housing sliding facing the body housing and then rotated, first and second hinge frames, first and second plates, a slide bar, and coupling means. However, it has a drawback in that the sliding housing is rotated regardless of the intention of a user in the state where the sliding housing slides. Another drawback in that the sliding housing slides irrespective of the intention of a user in the state where the sliding housing is slid and swung.

To overcome these drawbacks, a separate locking device composed of a plurality of parts must be installed in the portable communication device. Thus, due to an increase in the number of parts, the number of processes of assembling the portable communication device is increased which in turn increases the production cost.

Accordingly, there is a need for a portable communication device with a small number of parts capable of restricting swing operation during sliding as well as sliding operation during swinging modes.

SUMMARY OF THE INVENTION

Accordingly, the present invention has been made to solve the above-mentioned problems occurring in the prior art and provides additional advantages, by providing a stopper used in a sliding swing type portable communication device, in which the stopper is made up of a small number of parts for restricting swing operation after sliding operation as well as the sliding operation after the swing operation, thereby minimizing components of a product to improve an assembling process, reducing the cost of production, facilitating the sliding or swing operation for a sliding housing of the portable device, and improving sliding or swing operation of the terminal.

In accordance with an aspect of the present invention, a sliding swing type portable communication device includes a body housing, and a sliding housing opened or closed by sliding or swinging of the body housing, and a stopper device. The stopper device includes: a first sliding member coupled to the sliding housing; a second sliding member coupled to the first sliding member, for allowing the first sliding member to slide; a swing member coupled to the body housing, installed between the first and second sliding members, and allowing the first and second sliding members to swing; and a stopper unit provided to each member, restricting the swing of the sliding housing when the sliding housing slides and the sliding of the sliding housing when the sliding housing swings before sliding.

BRIEF DESCRIPTION OF THE DRAWINGS

The above and other aspects, features and advantages of the present invention will be more apparent to those skilled in the art from the following detailed description taken in conjunction with the accompanying drawings, in which.

DETAILED DESCRIPTION OF THE INVENTION

Hereinafter, exemplary embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. For the purposes of clarity and simplicity, a detailed description of known functions and configurations incorporated herein will be omitted as it may make the subject matter of the present invention unclear.

Referring to FIGS. 1 through 11, a stopper device for a sliding swing type portable communication device includes a body housing 10, a sliding housing 20, first and second sliding members 30 and 40, a swing member 50, and a stopper unit 60. The body housing 10 is configured to slide or swing the sliding housing 20, and the sliding housing 20 is installed on an upper face of the body housing 10 so as to be opened or closed by sliding or swinging motion with respect to the body housing 10. The first sliding member 30 is screwed to the sliding housing 20 so as to be slidably coupled with the second sliding member 40, which will be described below. The second sliding member 40 is coupled with the first sliding member 30 so as to be able to slide the first sliding member 30. The swing member 50 is coupled to the body housing 10 so as to be able to swing the first and second sliding members 30 and 40, and parts of the swing member 50 is interposed between the first and second sliding members 30 and 40. The stopper unit 60 is provided to the first and second sliding members 30 and 40 and the swing member 50 so as to restrict the swinging of the sliding housing 20 during sliding as well as the sliding of the sliding housing 20 during swinging before sliding.

Figure 1:
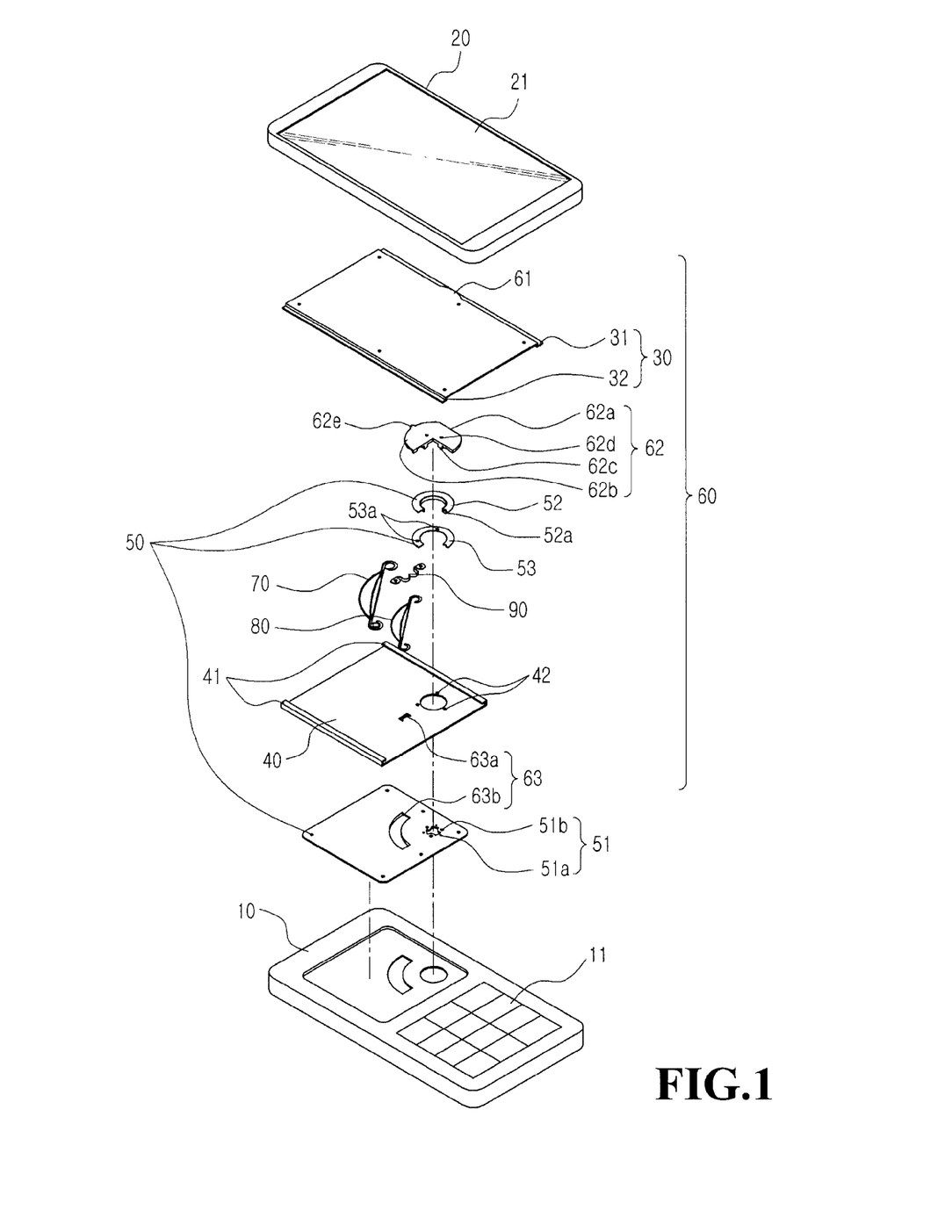
FIG. 1 is an exploded perspective view illustrating the configuration of a stopper device for a sliding swing type portable communication device according to an exemplary embodiment of the present invention.
Figure 2:
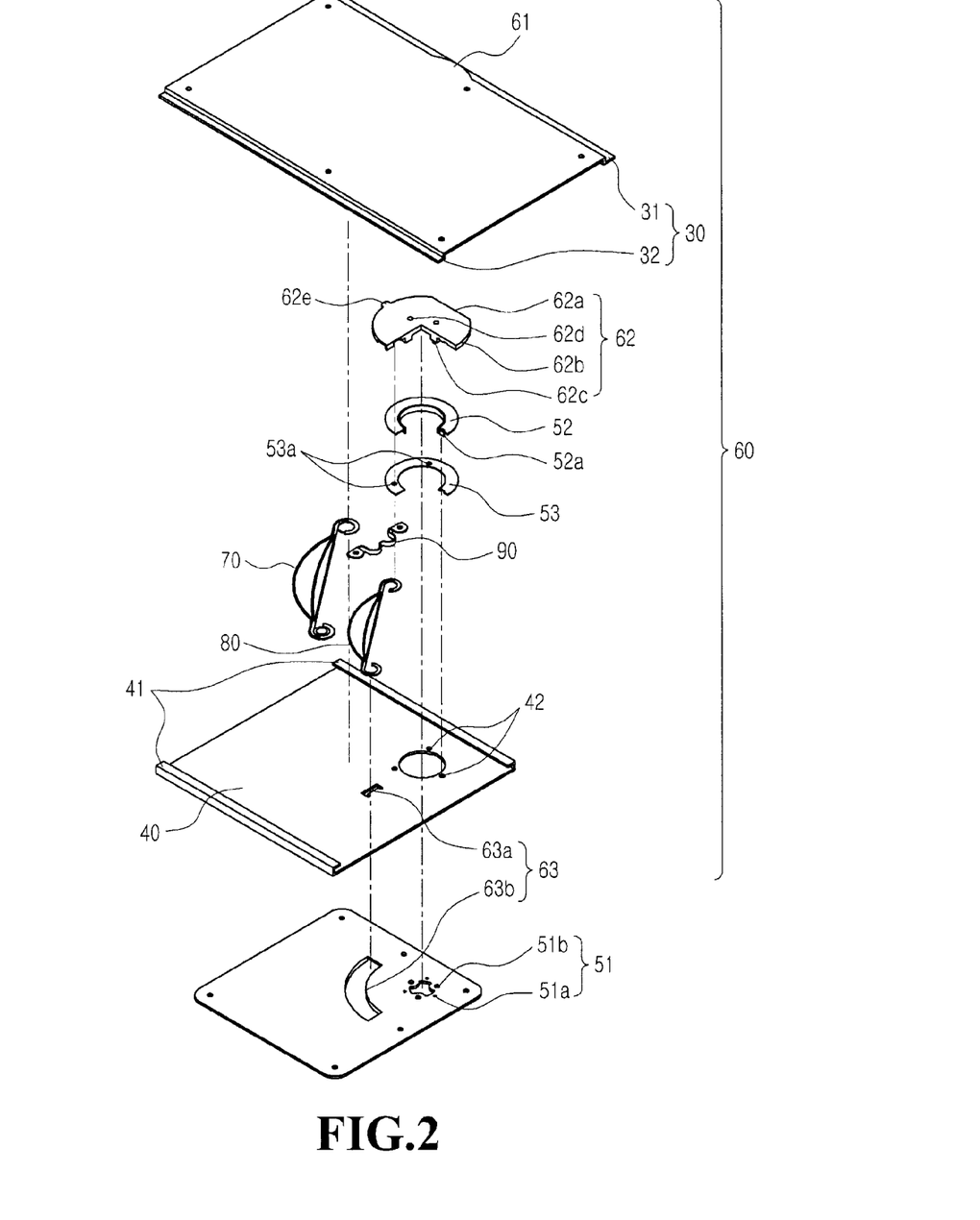
FIG. 2 is an enlarged exploded perspective view illustrating the configuration of a stopper device according to an exemplary embodiment of the present invention.
Figure 3:
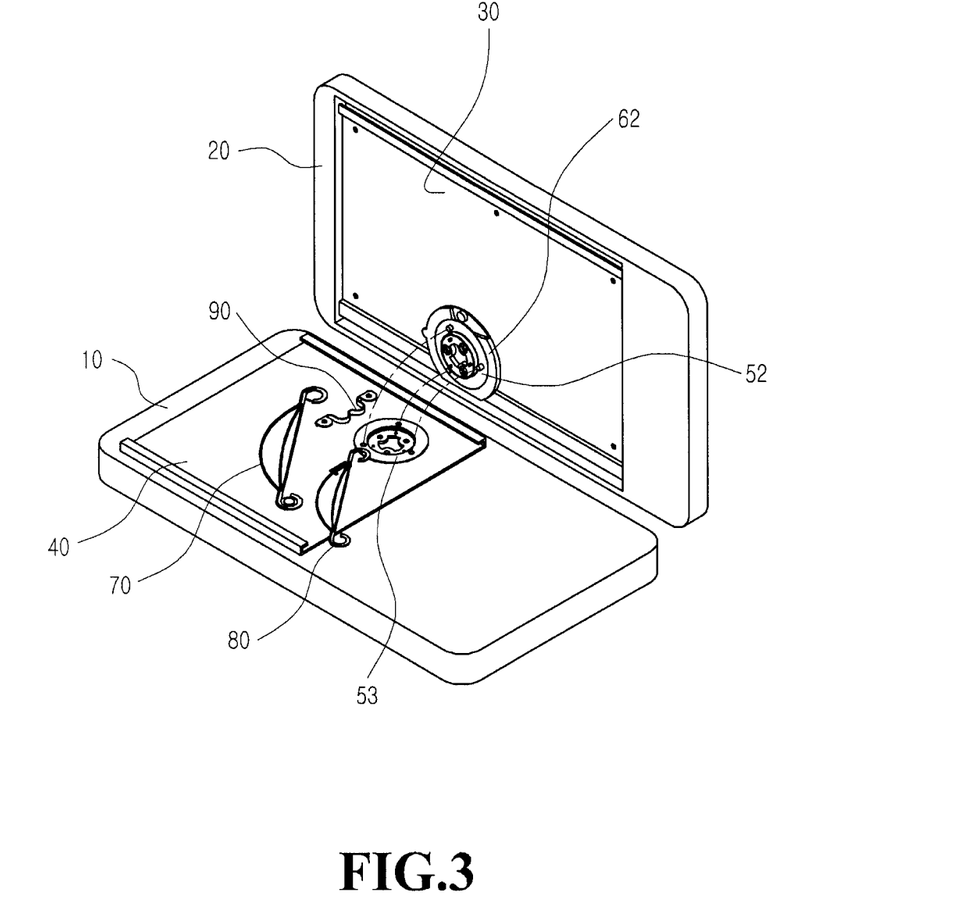
FIG. 3 is an exploded perspective view illustrating first and second sliding members in the configuration of a stopper device according to an exemplary embodiment of the present invention.
Figure 4:
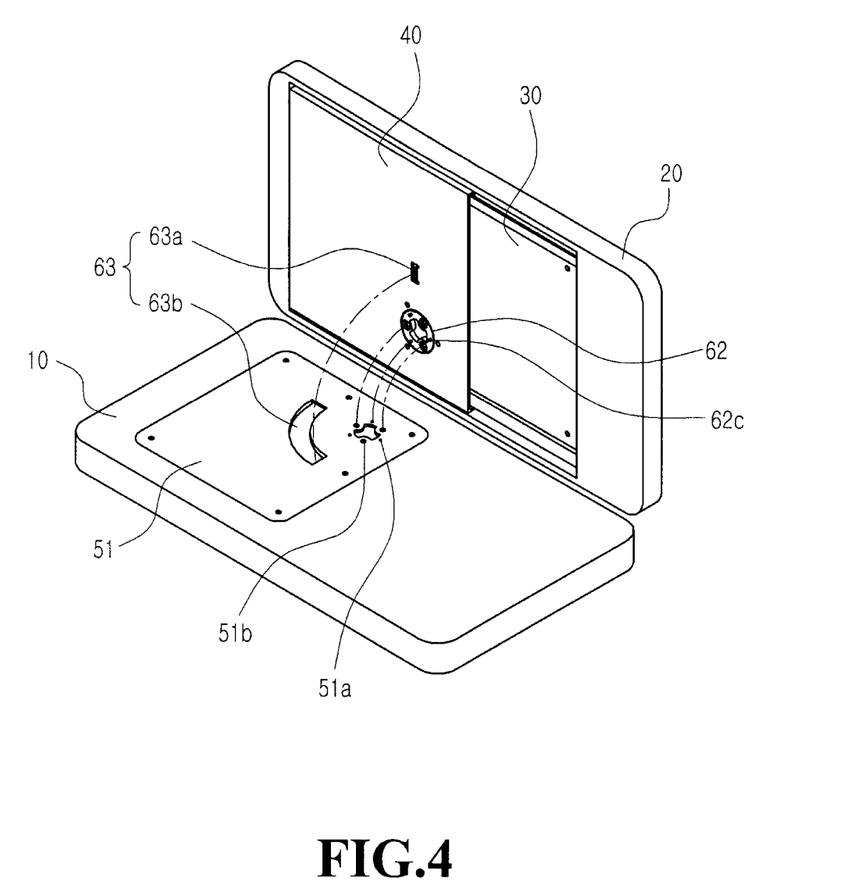
FIG. 4 is an exploded perspective view illustrating a swing member in the configuration of a stopper device according to an exemplary embodiment of the present invention.

As illustrated in FIGS. 1 and 2, the first sliding member 30 is provided with first and second guide rails 31 and 32 on opposite sides thereof which are slidably coupled with guide ribs 41 formed on the second sliding member 40. The first guide rail 31 is wider than the second guide rail 32 so as to be able to integrally form a stopper recess 61, which will be described below.

As illustrated in FIGS. 1 and 2, a first elastic member 70 is installed between the first and second sliding members 30 and 40 to provide an elastic force to the first sliding member 30 so as to be able to slide the first sliding member 30. One end of the first elastic member 70 is fastened to the first sliding member 30, and the other end of the first elastic member 70 is fastened to the second sliding member 40. A second elastic member 80 is installed between the first and second sliding members 30 and 40 to provide an elastic force to the first and second sliding members 30 and 40 so as to be able to slide the first and second sliding members 30 and 40. One end of the second elastic member 80 is fastened to the second sliding member 40, and the other end of the second elastic member 80 is fastened to a first stopper member 62, which will be described below.

As illustrated in FIGS. 1 through 11, the swing member 50 includes a swing plate 51, a rotary member 52, and a rotary washer 53. The swing plate 51 is coupled to the body housing 10 so as to be fixedly fastened to the first stopper member 62, which will be described below. The rotary member 52 is fixedly fitted into a hole formed in the second sliding member 40, and faces the first stopper member 62 so as to be swung together with the first and second sliding members 30 and 40 when swinging the first and second sliding members 30 and 40. The rotary washer 53 is installed between the second sliding member 40 and the rotary member 52 so as to support rotation of the rotary member 52. The rotary member 52 is provided with at least one coupling protrusion 52a so as to be fitted into the holes 42 and 53a formed in the second sliding member 40 and the rotary washer 53.

As illustrated in FIGS. 1 through 11, the stopper unit 60 includes a stopper recess 61 and first and second stopper members 62 and 63. The stopper recess 61 is integrally formed with the first sliding member 30 so as to be detachably coupled with the first stopper member 62. The first stopper member 62 is fixedly fastened to the swing plate 51 so as to be separated from the stopper recess 61 when the sliding housing 20 slides or swings to restrict the sliding or swing of the sliding housing 20. The second stopper members 63 are formed on the second sliding member 40 and in the swing plate 51 so as to restrict the swinging of the sliding housing 20.

As illustrated in FIGS. 6 through 11, the stopper recess 61 has a semispherical shape, and the first stopper member 62 has a disc shape. The first stopper member 62 is provided with a first stopper contact face 62a on one face thereof which is contacted with and guided along the first guide rail 31 of the first sliding member 30 when the sliding housing 20 slides so as to restrict the swing of the sliding housing 20.

As illustrated in FIGS. 5 through 11, the first stopper member 62 is provided with a second contact face 62b on an outer circumference thereof so as to be inserted into the stopper recess 61 when the sliding housing 20 swings to thereby restrict the sliding of the sliding housing 20. The first contact face 62a has a linear shape where the stopper member 62 is partly cut off.

As illustrated in FIGS. 1 through 11, the second stopper contact face 62b has a circular shape. The second stopper members 63 are divided into a stopper knob 63a and a guide stopper slot 63b. The stopper knob 63a is formed in the second sliding member 40 so as to swing along the guide stopper slot 63b, which will be described below, when the sliding housing 20 swings. The guide stopper slot 63b is formed in the swing plate 51 so as to guide and contact the stopper knob 63a to thereby restrict the swing of the sliding housing 20.

As illustrated in FIGS. 5 through 11, the second sliding member 40 is provided with a stopper click stop 90, which is detachably coupled with a detachable protrusion 62e protruding from the outer circumference of the first stopper member 62 when reaching at a swing initial position of the sliding housing 20, and not only restricts the swing of the sliding housing 20 but also provides a clicked feeling.

As illustrated in FIGS. 1 and 2, the first stopper member 62 is provided with at least one fastening protrusion 62c so as to be fastened to a fastening hole 51a formed in the swing plate 51. The first stopper member 62 is provided with screw holes 62d that are located adjacent to the fastening protrusion 62c and are screwed to screw holes 51b formed in the swing plate 51.

Note that the teachings of the present invention may be applicable to various portable communication devices, such as a flip-type, a folder-type, a bar-type, a sliding type, a sliding swing type depending on external geometry or its operating modes.

A sliding swing type portable communication device according has been representatively shown for illustrative purposes, but should not limit the scope of present invention. Examples of the portable communication device may include all information communication appliances or duplex systems, such as portable multimedia players, MP3 players, digital broadcasting players, person digital assistants, smart phones, and so one, multimedia appliances, and applications thereof, including all mobile communication terminals operated based on communication protocols corresponding to various communication systems.

Now, the operation of the stopper device for the sliding swing type portable communication device, having the aforementioned configuration, according to an exemplary embodiment of the present invention will be described in greater details with reference to FIGS. 1 through 11.

Referring back to FIGS. 1 through 4, the sliding swing type portable communication device includes the body housing 10 having a keypad 11, the sliding housing 20 having a display device 21, the first and second sliding members 30 and 40, the swing member 50, and the stopper unit 60.

In this state, at least one coupling protrusion 52a formed on the rotary member 52 of the swing member 50 is fitted into the hole 53a formed in the rotary washer 53. Then, the coupling protrusion 52a is fitted into the hole 42 formed in the second sliding member 40.

The rotary member 52 faces the first stopper member 62 and is rotatably coupled to the first stopper member 62.

Here, the detachable protrusion 62e protruding from the outer circumference of the first stopper member 62 is coupled to the stopper click stop 90 formed on the second sliding member 40.

The first and second guide rails 31 and 32 formed on the opposite sides of the first sliding member 30 are slidably coupled to the guide ribs 41 formed on the second sliding member 40.

Here, as illustrated in FIGS. 1 and 2, the first elastic member 70 providing an elastic force so as to be able to slide the first sliding member 30 is installed between the first and second sliding members 30 and 40. The second elastic member 80 providing an elastic force so as to be able to swing first and second sliding members 30 and 40 is installed between the first and second sliding members 30 and 40.

As illustrated in FIG. 1, the swing plate 51 is located under the second sliding member 40. The fastening protrusion 62c formed on the first stopper member 62 is fastened to the fastening hole 51a formed in the swing plate 51.

The first stopper member 62 has the screw holes 62d, which are located adjacent to the fastening protrusion 62c and are screwed to screw holes 51b formed in the swing plate 51.

The screw holes 62d are screwed with screws (not shown), the first stopper member 62 is fixedly fastened to the swing plate 51.

Here, the stopper knob 63a formed on the second sliding member 40 is in contact with the guide stopper slot 63b formed in the swing plate 51.

In this state, as illustrated in FIGS. 5 through 8, when a user slides the sliding housing 20 on the body housing 10, the guide rails 31 and 32 of the first sliding member 30 slides along the guide ribs 41 of the second sliding member 40.

Figure 7:
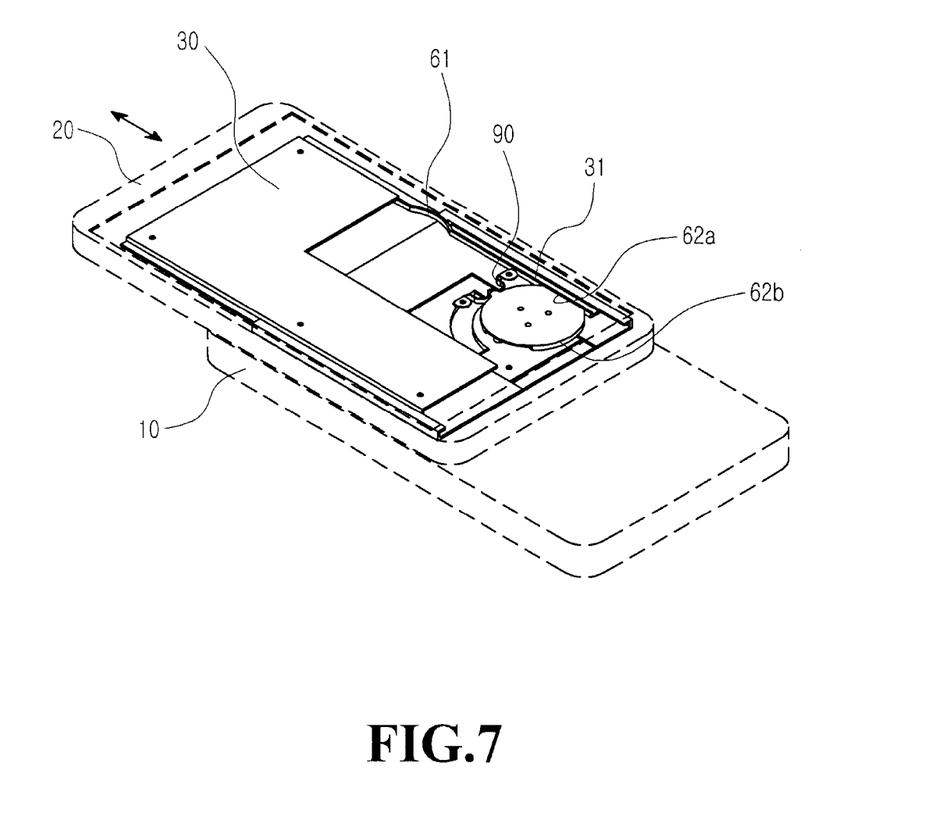
FIG. 7 is a perspective view illustrating the state after the sliding operation of a stopper device according to an exemplary embodiment of the present invention.
Figure 8:
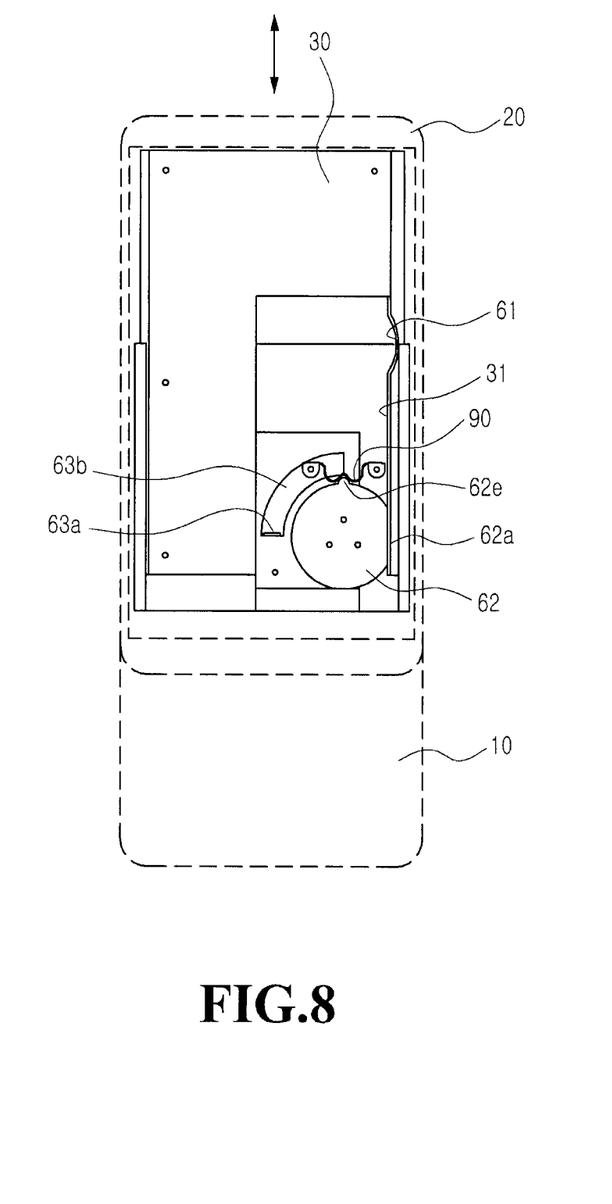
FIG. 8 is a top plan view illustrating the state after the sliding operation of a stopper device according to an exemplary embodiment of the present invention.

At this time, as illustrated in FIGS. 7 and 8, the first stopper contact face 62a of the first stopper member 62 is guided along the first guide rail 31, thereby restricting the swing of the sliding housing 20. The first stopper member 62 is separated from the stopper recess 61 formed in the first sliding member 30.

Figure 5:
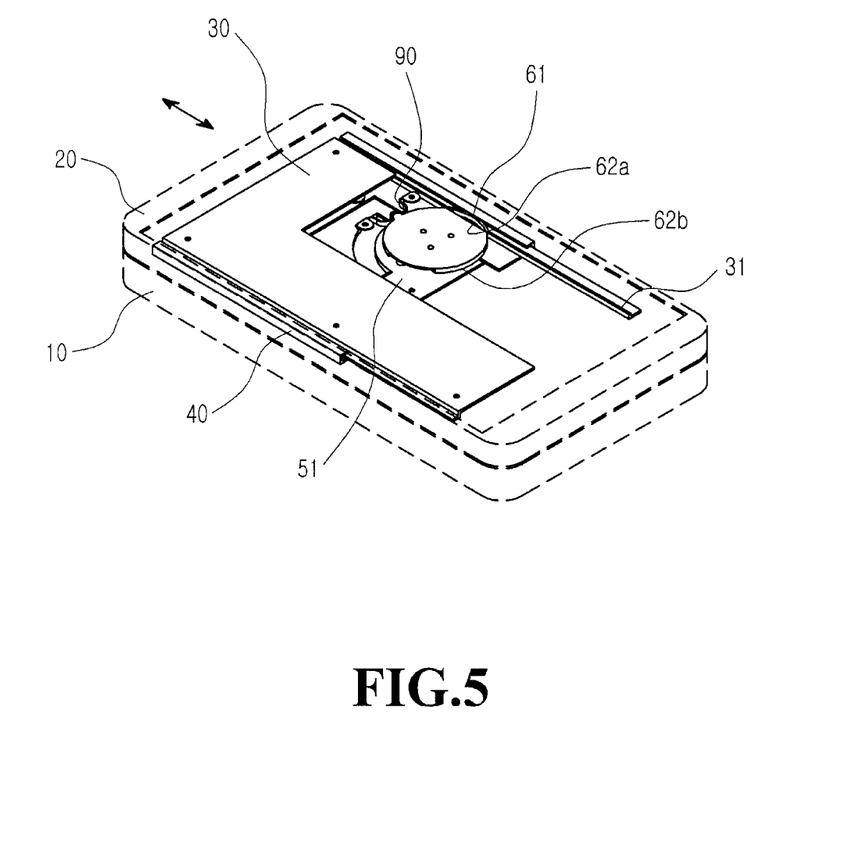
FIG. 5 is a perspective view illustrating the state before the sliding operation of a stopper device according to an exemplary embodiment of the present invention.
Figure 6:
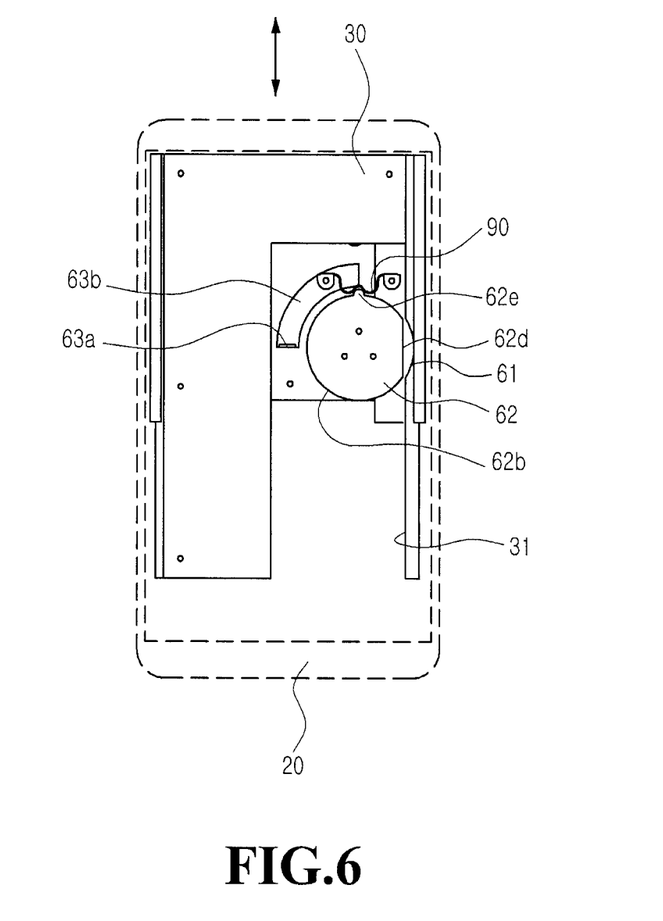
FIG. 6 is a top plan view illustrating the state before the sliding operation of a stopper device according to an exemplary embodiment of the present invention.

Here, as illustrated in FIGS. 5 and 6, when the user slides the sliding housing 20 again, the sliding housing 20 returns to its original position so as to face the body housing 10.

At this time, the first sliding member 30 having the stopper recess 61 slides together with the sliding housing, then the stopper recess 61 faces the first stopper member 62.

Figure 9:
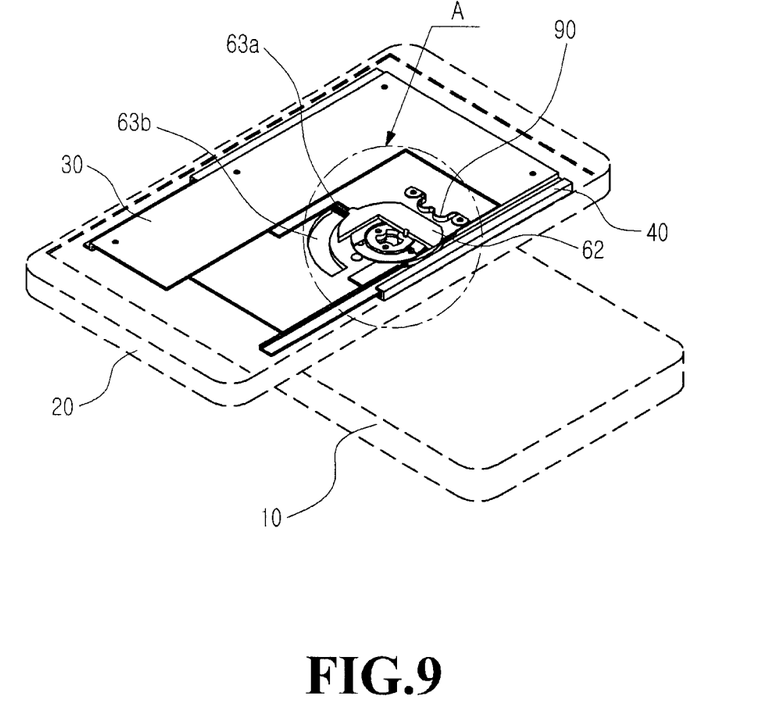
FIG. 9 is a perspective view illustrating the swing operation of a stopper device according to an exemplary embodiment of the present invention.
Figure 10:
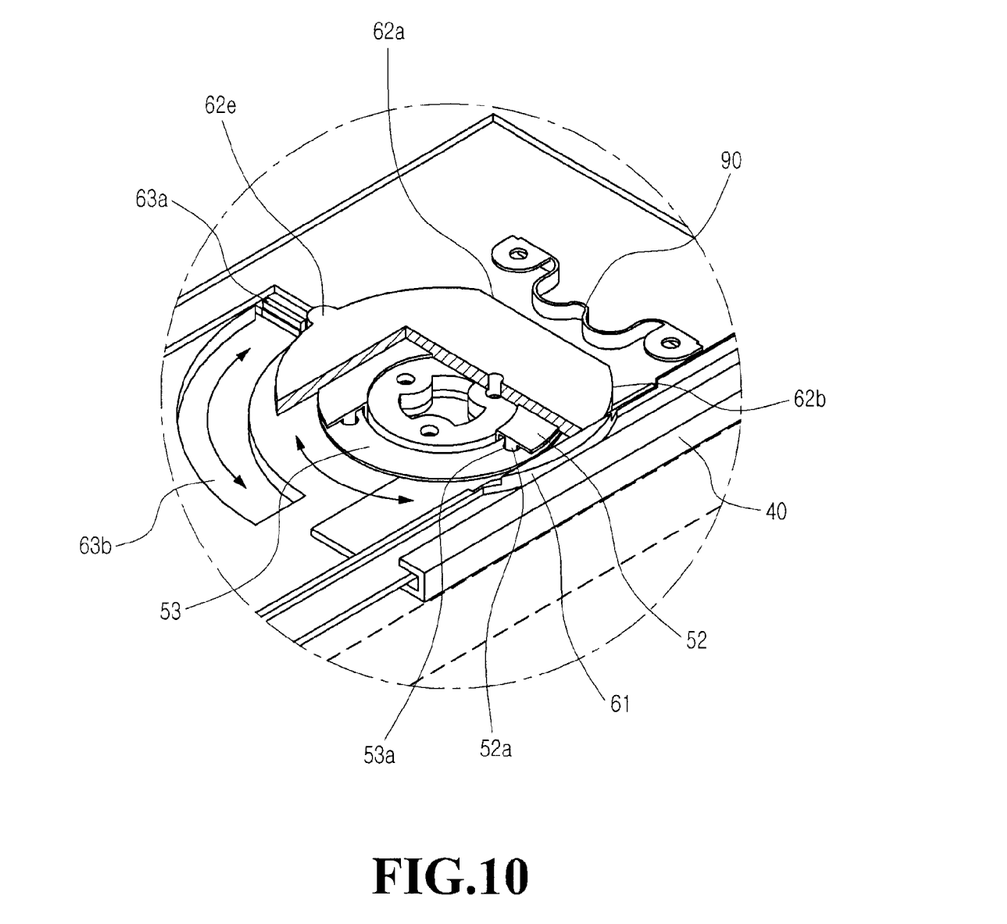
FIG. 10 is an enlarged perspective view of part A of FIG. 9.
Figure 11:
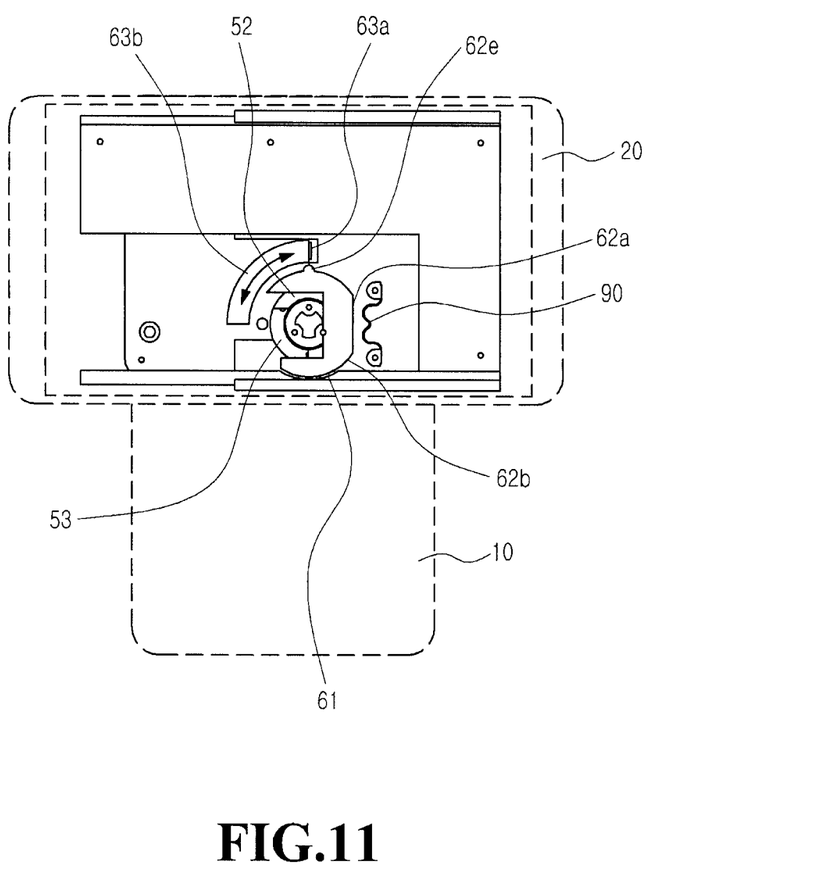
FIG. 11 is a top plan view illustrating the sliding operation of a stopper device according to an exemplary embodiment of the present invention.

In this state, as illustrated in FIGS. 9 through 11, when the user swings the sliding housing 20, the first and second sliding members and the stopper click stop 90 swing together with the sliding housing 20.

At this time, as illustrated in FIGS. 9 through 11, the detachable protrusion 62e formed on the first stopper member 62 is separated from the stopper click stop 90.

As illustrated in FIGS. 10 and 11, the stopper knob 63a formed on the second sliding member 40 is guided and swung along the guide stopper slot 63b formed in the swing plate 51, and comes into contact with the opposite end of the stopper slot 61, thereby restricting the swing motion.

At this time, as illustrated in FIG. 11, the first sliding member 30 and the stopper recess 61 (part of the first sliding member 30) are swung together, and thus the second stopper contact face 62b of the first stopper member 62 is inserted into the stopper recess 61.

In this state, when the sliding housing 20 is swung, its sliding movement is restricted.

Here, as illustrated in FIGS. 5 and 6, when the user swings the sliding housing 20 again so as to face the body housing 10, the first and second sliding members 30 and 40 and the rotary member 52 swing together.

At this time, as illustrated in FIG. 6, when the sliding housing 20 reaches its initial position, the detachable protrusion 62e of the first stopper member 62 is inserted into the stopper click stop 90, thereby providing a clicked feeling. The stopper recess 61 of the first sliding member 30 faces the first stopper contact face 62a.

Further, the stopper knob 63a of the second sliding member 40 is guided and swung along the guide stopper slot 63b, and comes into contact with one end of the guide stopper slot 63b, thereby restricting the swing of the sliding housing 20.

In this manner, the stopper unit 60 restricts the swinging of the sliding housing 20 when the sliding housing 20 slides, as well as the sliding of the sliding housing 20 when the sliding housing 20 swings before sliding, so that it is possible to easily slide and swing the product, particularly the sliding housing.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A stopper device for a sliding swing type portable communication device having a body housing and a sliding housing opened or closed by sliding or swinging motion, comprising:
   a first sliding member coupled to the sliding housing;
   a second member coupled to the first sliding member to enable the first sliding member to slide;

a swing member, having at least a part thereof disposed between the first and second members, coupled to the body housing to enable the first and second members to swing; and a stopper member interfacing with each of the first sliding member, the second member and the swing member, to restrict the swinging of the sliding housing when the sliding housing slides and restricting the sliding of the sliding housing when the sliding housing swings before sliding.

2. The stopper device according to claim 1, wherein:
the first sliding member includes first and second guide rails on opposite sides thereof which are slidably coupled with guide ribs formed on the second member; and the first guide rail is wider than the second guide rail.

3. The stopper device according to claim 1, wherein:
the first sliding member and the second member have a first elastic member installed therebetween to provide an elastic force to slide the first sliding member; and
the first sliding member and the second member have a second elastic member installed therebetween to provide an elastic force to swing the first sliding member and the second member.

4. The stopper device according to claim 1, wherein:
the stopper member has a disc shape.

5. The stopper device according to claim 4, wherein the stopper member has a
first stopper contact face comprising a linear shape where the stopper member is partly cut off.

6. The stopper device according to claim 5, wherein:
the stopper member has a second stopper contact face comprising a circular shape.

7. The stopper device according to claim 6, wherein the stopper member provides a clicked sensation during operation.

8. The stopper device of claim 1, wherein the first sliding member includes first and second guide rails on opposite sides thereof which are slidably coupled with guide ribs formed on the second member.

9. A stopper device for a sliding swing type portable communication device having a body housing and a sliding housing opened or closed by sliding or swinging motion, comprising:
a first sliding member coupled to the sliding housing;
a second member coupled to the first sliding member to enable the first sliding member to slide;
a swing member, having at least a part thereof disposed between the first and second members, coupled to the body housing to enable the first and second members to swing; and
a stopper member interfacing with each of the first sliding member, the second member and the swing member, to restrict the swinging of the sliding housing when the sliding housing slides and restricting the sliding of the sliding housing when the sliding housing swings before sliding;
wherein the swing member comprises:
a swing plate coupled to the body housing;
a rotary member fixedly coupled to the second member and swinging together with the first sliding member and the second member; and
a rotary washer installed between the second member and the rotary member.

10. The stopper device according to claim 9, wherein the rotary member includes at least one coupling protrusion fitted into holes formed in the second member and the rotary washer.

11. The stopper device according to claim 9, wherein the stopper member is a first stopper member, and the stopper device further including:
a stopper recess formed in the first sliding member;
the first stopper member is fixedly fastened to the swing plate, separated from the stopper recess when the sliding housing slides or swings to restrict the sliding or swinging of the sliding housing; and
a second stopper member formed on the second member and in the swing plate so as to restrict the swinging of the sliding housing.

12. The stopper device according to claim 11, wherein the stopper recess has a semispherical shape.

13. The stopper device according to claim 11, wherein:
the first stopper member includes a first stopper contact face on one face thereof, which is contacted with and guided along a first guide rail of the first sliding member when the sliding housing slides and restricts the swinging of the sliding housing; and
the first stopper member includes a second stopper contact face on an outer circumference thereof, which is inserted into the stopper recess when the sliding housing swings and restricts the sliding of the sliding housing.

14. The stopper device according to claim 11, wherein the second stopper members includes:
a stopper knob formed in the second member; and
a guide stopper slot formed in the swing plate, guiding and contacting the stopper knob, and restricting the swinging of the sliding housing.

15. The stopper device according to claim 11, wherein the second member includes a stopper, which is detachably coupled with a detachable protrusion protruding from the outer circumference of the first stopper member when reaching at a swing initial position of the sliding housing, restricting the swinging of the sliding housing.

16. The stopper device according to claim 11, wherein the first stopper member includes:
at least one fastening protrusion fastened to a fastening hole formed in the swing plate; and
screw holes that are located adjacent to the fastening protrusion and screwed to screw holes formed in the swing plate.

17. A sliding swing type portable communication device having a body housing and a sliding housing opened or closed by sliding or swinging motion, comprising:
a first sliding member coupled to the sliding housing;
a second member coupled to the first sliding member to enable the first sliding member to slide;
a swing member, having at least a part thereof disposed between the first and second members, coupled to the body housing to enable the first and second members to swing; and
a stopper member interfacing with each of the first sliding member, the second member and the swing member, to restrict the swinging of the sliding housing when the sliding housing slides and restricting the sliding of the sliding housing when the sliding housing swings before sliding.

18. The portable communication device of claim 17, wherein the first sliding member includes first and second guide rails on opposite sides thereof which are slidably coupled with guide ribs formed on the second member.

19. The portable communication device of claim 17, wherein the swing member comprises:
a swing plate coupled to the body housing;

a rotary member fixedly coupled to the second member and swinging together with the first and second members; and a rotary washer installed between the second member and the rotary member.

20. The portable communication device of claim 17, wherein the stopper member has a disc-like shape with a first stopper contact face in a linear shape where the first stopper member is partly cut off.

* * * * *